(12) United States Patent
Meazle

(10) Patent No.: US 12,146,264 B2
(45) Date of Patent: *Nov. 19, 2024

(54) PAPER PRODUCTS HAVING INCREASED BENDING STIFFNESS AND CROSS-DIRECTION STRENGTH AND METHODS FOR MAKING THE SAME

(71) Applicant: INTERNATIONAL PAPER COMPANY, Memphis, TN (US)

(72) Inventor: John Mullaney Meazle, Dallas, TX (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,155

(22) Filed: Sep. 12, 2022

(65) Prior Publication Data

US 2023/0250582 A1    Aug. 10, 2023

Related U.S. Application Data

(63) Continuation of application No. 16/239,935, filed on Jan. 4, 2019, now Pat. No. 11,441,268.

(Continued)

(51) Int. Cl.
  *D21F 1/02*    (2006.01)
  *B32B 29/00*   (2006.01)
  (Continued)

(52) U.S. Cl.
  CPC .............. *D21F 1/02* (2013.01); *B32B 29/00* (2013.01); *D21F 1/06* (2013.01); *D21F 1/18* (2013.01);
  (Continued)

(58) Field of Classification Search
  CPC ... D21F 1/02; D21F 11/04; D21F 1/20; D21F 1/18; D21F 9/006; D21F 1/483;
  (Continued)

(56) References Cited

U.S. PATENT DOCUMENTS 1,881,105 A    10/1932    Vedder
2,699,709 A    1/1955    Breuning
(Continued)

FOREIGN PATENT DOCUMENTS

DE    2041108    2/1971
DE    102005010627 A1    9/2006
(Continued)

*Primary Examiner* — Jose A Fortuna
(74) *Attorney, Agent, or Firm* — Thomas W. Barnes, III

(57) ABSTRACT

A process for making a paper product comprising: providing a forming fabric; causing the forming fabric to rotate such that an upper surface of the forming fabric moves in a machine direction; providing a multi-layer headbox comprising first and second inlet headers and a slice outlet; providing a first aqueous slurry of first fibers to the first inlet header and a second aqueous slurry of second fibers to the second inlet header; combining streams of the first and second aqueous slurries to define a jet exiting the slice outlet; emitting the jet onto the upper surface of the forming fabric to form a web; causing the forming fabric to oscillate in a direction transverse to the machine direction, whereby at least a significant number of the first fibers are caused to align in a direction that deviates from the machine direction; and forming the paper product from the web.

17 Claims, 7 Drawing Sheets

Related U.S. Application Data

(60) Provisional application No. 62/614,035, filed on Jan. 5, 2018.

(51) Int. Cl.
  *D21F 1/06*   (2006.01)
  *D21F 1/18*   (2006.01)
  *D21F 1/20*   (2006.01)
  *D21F 9/00*   (2006.01)
  *D21F 11/04*  (2006.01)
  *D21H 27/00*  (2006.01)

(52) U.S. Cl.
  CPC ............... *D21F 1/20* (2013.01); *D21F 9/006* (2013.01); *D21F 11/04* (2013.01); *D21H 27/00* (2013.01)

(58) Field of Classification Search
  CPC ........... D21F 11/02; D21F 1/06; D21H 27/38; D21H 27/30; B32B 29/00
  See application file for complete search history.

(56) References Cited

U.S. PATENT DOCUMENTS

| | | |
|---|---|---|
| 3,013,606 A | 12/1961 | Goddard |
| 3,133,855 A | 5/1964 | Carpenter |
| 3,184,374 A | 5/1965 | Pearson |
| 3,582,465 A | 6/1971 | Salomon |
| 3,598,694 A | 8/1971 | Wiebe |
| 3,802,966 A | 4/1974 | Delekta |
| 3,810,817 A | 5/1974 | Arledter |
| 3,994,771 A | 11/1976 | Morgan, Jr. |
| 4,055,460 A | 10/1977 | Buchanan |
| 4,070,238 A | 1/1978 | Wahren |
| 4,300,981 A | 11/1981 | Carstens |
| 4,384,922 A | 5/1983 | Stotz |
| 4,436,587 A | 3/1984 | Andersson |
| 4,477,313 A | 10/1984 | Anderson |
| 4,532,009 A | 7/1985 | Nickerson |
| 4,648,943 A | 3/1987 | Malashenko |
| 4,781,793 A | 11/1988 | Malme |
| 5,147,505 A | 9/1992 | Altman |
| 5,227,023 A | 7/1993 | Pounder et al. |
| 5,401,363 A | 3/1995 | Begemann et al. |
| 5,487,813 A | 1/1996 | Vinson et al. |
| 5,560,808 A | 10/1996 | Graf |
| 5,609,726 A | 3/1997 | Sollinger |
| 5,674,363 A | 10/1997 | Huovila et al. |
| 5,707,495 A | 1/1998 | Heinzmann et al. |
| 5,804,108 A | 9/1998 | Wilkinson |
| 5,849,159 A | 12/1998 | Heinzmann et al. |
| 5,906,894 A | 5/1999 | West |
| 5,958,185 A | 9/1999 | Vinson |
| 6,027,611 A | 2/2000 | McFarland |
| 6,059,929 A | 5/2000 | Dahl |
| 6,096,152 A | 8/2000 | Anderson |
| 6,146,496 A | 11/2000 | Phan |
| 6,210,535 B1 | 4/2001 | Huovila et al. |
| 6,303,001 B1 | 10/2001 | Grossmann et al. |
| 6,544,387 B2 | 4/2003 | Huovila et al. |
| 6,702,925 B2 | 3/2004 | Bricco |
| 7,387,702 B2 | 6/2008 | Norlander |
| 7,597,779 B2 | 10/2009 | Gupta |
| 7,608,165 B2* | 10/2009 | Raisanen ................ D21F 9/006 162/217 |
| 7,820,874 B2 | 10/2010 | Manifold |
| 7,988,825 B2* | 8/2011 | Aula ....................... D21F 11/04 162/132 |
| 8,070,916 B2 | 12/2011 | Scherb |
| 8,308,909 B2* | 11/2012 | Haussler ................... D21F 1/02 162/341 |
| 10,577,748 B2 | 3/2020 | Mauler |
| 10,883,228 B2 | 1/2021 | Bradbury |
| 11,441,268 B2* | 9/2022 | Meazle ..................... D21F 1/20 |
| 2001/0037867 A1 | 11/2001 | Huovila |
| 2002/0153113 A1 | 10/2002 | Ruf |
| 2002/0162635 A1 | 11/2002 | Hsu |
| 2003/0056916 A1 | 3/2003 | Horenziak |
| 2004/0154775 A1 | 8/2004 | Park |
| 2004/0168779 A1 | 9/2004 | Silenius |
| 2005/0103458 A1 | 5/2005 | Ono |
| 2006/0243404 A1* | 11/2006 | Scherb ..................... D21F 1/02 162/111 |
| 2008/0121360 A1 | 5/2008 | Hietaniemi et al. |
| 2009/0321027 A1* | 12/2009 | Hermans ............... D21F 11/145 162/111 |
| 2010/0207377 A1 | 8/2010 | Camus |
| 2011/0180224 A1 | 7/2011 | Kozuka |
| 2011/0303382 A1 | 12/2011 | Haussler et al. |
| 2012/0103544 A1 | 5/2012 | Scherb |
| 2018/0313038 A1 | 11/2018 | Bradbury |
| 2019/0211503 A1 | 7/2019 | Meazle |
| 2021/0087751 A1 | 3/2021 | Bradbury |
| 2023/0250582 A1* | 8/2023 | Meazle ..................... D21F 1/20 162/336 |

FOREIGN PATENT DOCUMENTS

| | | | |
|---|---|---|---|
| EP | 1911879 A1 | 4/2008 | |
| GB | 535930 | 4/1941 | |
| GB | 1326052 | 8/1973 | |
| JP | 07145590 A | 6/1995 | |
| RU | 2482234 C2 | 5/2013 | |
| WO | WO-9817860 | 4/1998 | |
| WO | WO-2009068728 A1 * | 6/2009 | ............ D21F 9/006 |
| WO | WO-2016083170 | 6/2016 | |
| WO | WO-2019136250 A1 * | 7/2019 | ............... D21F 1/02 |
| WO | WO-2019136254 A1 * | 7/2019 | ............... D21F 1/02 |
| WO | WO-2020043338 | 3/2020 | |
| WO | WO-2020043338 A1 * | 3/2020 | ............... D21F 1/20 |

* cited by examiner

PAPER PRODUCTS HAVING INCREASED BENDING STIFFNESS AND CROSS-DIRECTION STRENGTH AND METHODS FOR MAKING THE SAME

CROSS-REFERENCE TO RELATED APPLICATIONS

This application claims the benefit of U.S. Provisional Application No. 62/614,035, filed Jan. 5, 2018.

FIELD OF THE INVENTION

The present disclosure relates generally to paper products and more particularly to paper products having increased bending stiffness and cross-direction strength and methods for making the same.

BACKGROUND OF THE INVENTION

Bending stiffness, tensile strength, and compressive strength are important characteristics of many paper products such as, for example, products used to fabricate folding boxboard, liquid packages, cartons, and corrugated containers. Multi-layer or multi-ply paper products, which are generally stiffer and exhibit greater tensile and compressive strength than corresponding single-ply products, have been widely used in the production of such articles. In some conventional papermaking technologies, aqueous slurries of wood fibers are supplied to a multi-layer headbox that enables the production of a paper product comprising two or more layers or plies.

Each of the aqueous slurries may comprise fibers with particular properties (e.g., fiber length, wood species, recycled vs. virgin fibers, etc.) and/or that have undergone one or more processing treatments (e.g., refining) such that each layer or ply comprises fibers with different properties to enable the production of paper products having specialized characteristics. In addition, it is known to oscillate or shake one or more components of the papermaking machine, e.g., the forming fabric onto which the aqueous slurries are deposited and/or the breast roll, to improve the formation of the paper product.

However, a need still exists for a paper product having improved bending stiffness and cross-direction tensile and compressive strength and methods for making the same.

SUMMARY OF THE INVENTION

In accordance with a first aspect of the present disclosure, a process for making a paper product is provided. The process may comprise: providing a forming fabric carried by a breast roll and at least one additional roll; causing the forming fabric to rotate such that an upper surface of the forming fabric moves in a machine direction; providing a multi-layer headbox comprising first and second inlet headers and a multi-layer headbox slice outlet, the first inlet header being located below the second inlet header; providing a first aqueous slurry of first fibers to the first inlet header and a second aqueous slurry of second fibers to the second inlet header, the first fibers having an average length greater than an average length of the second fibers; combining streams of the first and second aqueous slurries in a region of the multi-layer headbox slice outlet to define a jet exiting the multi-layer headbox slice outlet; emitting the jet of combined, yet still stratified, slurries onto the upper surface of the forming fabric, in which the jet of combined slurries forms a web on the forming fabric and in which a greater percentage of the first fibers are nearer the forming fabric than the second fibers; causing the forming fabric to oscillate in a direction transverse to the machine direction, whereby at least a significant number of the first fibers are caused to align in a direction that deviates from the machine direction; and forming the paper product from the web.

The at least one additional roll may comprise a driven roll, and causing the forming fabric to rotate may comprise driving the driven roll.

The method may further comprise: maintaining the streams of the first and second aqueous slurries separate from one another as the first and second aqueous slurries move from the first and second inlet headers to the region of the multi-layer headbox slice outlet.

In one example, causing the forming fabric to oscillate may comprise applying oscillating movement to a fiber alignment structure in contact with the forming fabric. In another example, causing the forming fabric to oscillate may comprise causing the breast roll to move in a direction generally parallel to an axis of the breast roll.

The forming fabric may be oscillated to cause the significant number of first fibers to align in a direction extending from between >0 and ≤90 degrees relative to the machine direction.

In some examples, the paper product may comprise paper. In other examples, the paper product may comprise a paperboard.

The multi-layer headbox may further comprise a third inlet header located above the second inlet header, and the method may further comprise: providing a third aqueous slurry of third fibers to the third inlet header; and combining a stream of the third aqueous slurry with the streams of the first and second aqueous slurries in the region of the multi-layer headbox slice outlet to define the jet exiting the multi-layer headbox slice outlet. In some aspects, the third fibers may have an average length that is less than the average length of the first fibers. In other aspects, the third fibers may have an average length that is equal to or greater than the average length of the first fibers.

In accordance with a second aspect of the present disclosure, a paper product is provided. The paper product may be made by a process comprising: providing a forming fabric carried by a breast roll and at least one additional roll; causing the forming fabric to rotate such that an upper surface of the forming fabric moves in a machine direction; providing a multi-layer headbox comprising first and second inlet headers and a multi-layer headbox slice outlet, the first inlet header being located below the second inlet header; providing a first aqueous slurry of first fibers to the first inlet header and a second aqueous slurry of second fibers to the second inlet header, the first fibers having an average length greater than an average length of the second fibers; combining streams of the first and second aqueous slurries in a region of the multi-layer headbox slice outlet to define a jet exiting the multi-layer headbox slice outlet; emitting the jet of combined, yet still stratified, slurries onto the upper surface of the forming fabric, in which the jet of combined slurries forms a web on the forming fabric and in which a greater percentage of the first fibers are nearer the forming fabric than the second fibers; causing the forming fabric to oscillate in a direction transverse to the machine direction, whereby at least a significant number of the first fibers are caused to align in a direction that deviates from the machine direction; and forming the paper product from the web.

The at least one additional roll may comprise a driven roll, and causing the forming fabric to rotate may comprise driving the driven roll.

The process may further comprise: maintaining the streams of the first and second aqueous slurries separate from one another as the first and second aqueous slurries move from the first and second inlet headers to the region of the multi-layer headbox slice outlet.

In one example, causing the forming fabric to oscillate may comprise applying oscillating movement to structure in contact with the forming fabric. In another example, causing the forming fabric to oscillate may comprise causing the breast roll to move in a direction generally parallel to an axis of the breast roll.

The forming fabric may be oscillated to cause the significant number of first fibers to align in a direction extending from between >0 and ≤90 degrees relative to the machine direction.

In some examples, the paper product may comprise paper. In other examples, the paper product may comprise a paperboard.

The multi-layer headbox may further comprise a third inlet header located above the second inlet header, and the method may further comprise: providing a third aqueous slurry of third fibers to the third inlet header; and combining a stream of the third aqueous slurry with the streams of the first and second aqueous slurries in the region of the multi-layer headbox slice outlet to define the jet exiting the multi-layer headbox slice outlet. In some aspects, the third fibers may have an average length that is less than the average length of the first fibers. In other aspects, the third fibers may have an average length that is equal to or greater than the average length of the first fibers.

In accordance with a third aspect of the present disclosure, a paper product comprising first fibers and second fibers is provided, in which: the first fibers may comprise an average length greater than an average length of the second fibers; a majority of fibers located near one outer surface may comprise the first fibers and a majority of the fibers located toward an opposing outer surface may comprise the second fibers; and the first fibers may be biased away from a direction in which the majority of the second fibers are aligned.

The majority of the second fibers may be aligned in substantially a machine direction, and the majority of the first fibers may be biased toward a cross-machine direction.

The first fibers may be biased in a direction extending from between >0 and ≤90 degrees relative to the machine direction.

The paper product may further comprise third fibers that are located near the opposing outer surface. In some aspects, the third fibers may have an average length that is less than the average length of the first and second fibers. In other aspects, the third fibers may have an average length that is equal to or greater than the average length of the first fibers.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
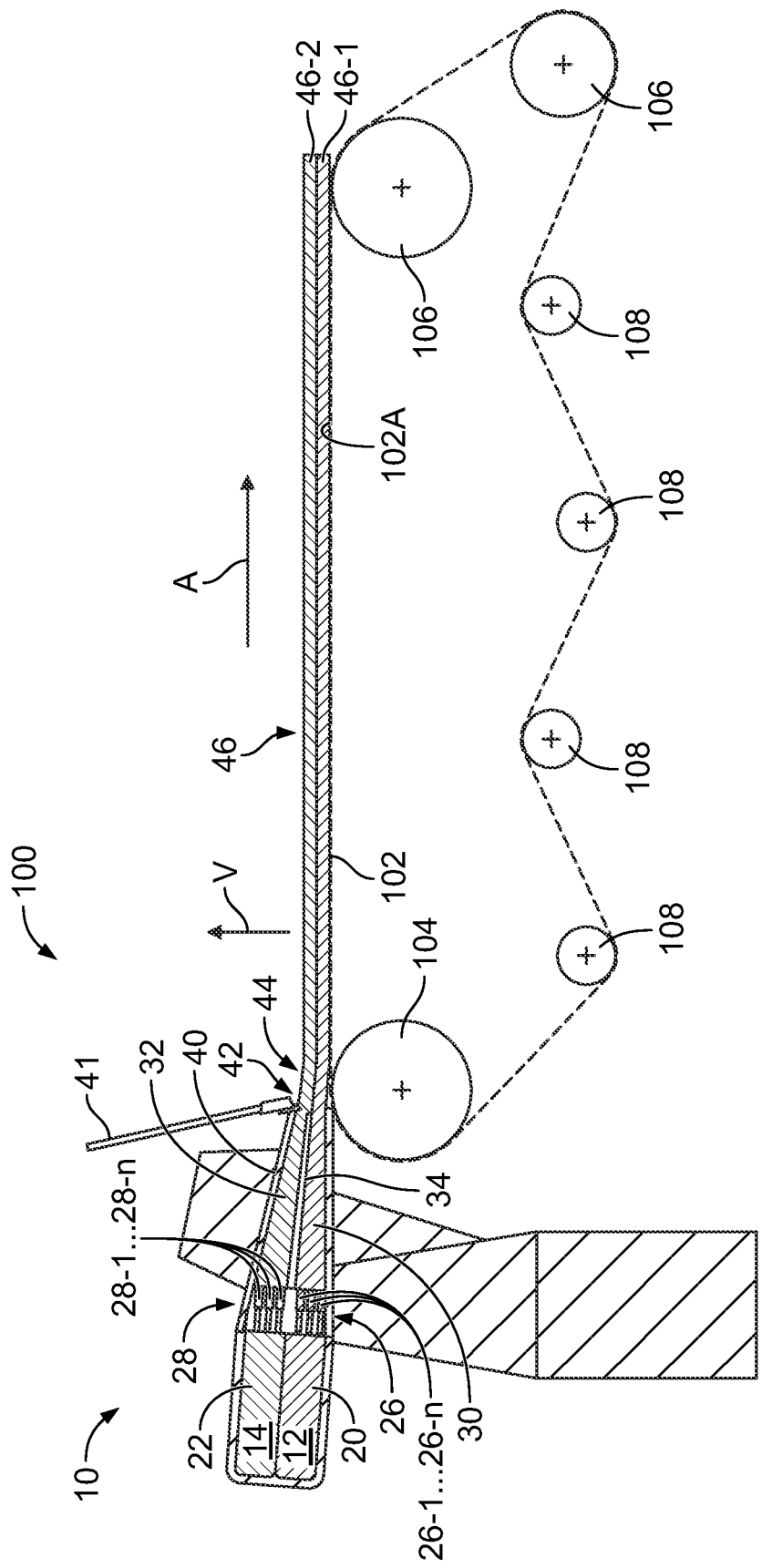
FIG. 1 is a side view of a portion of a Fourdrinier forming section of a papermaking machine with a two-layer headbox.
Figure 2:
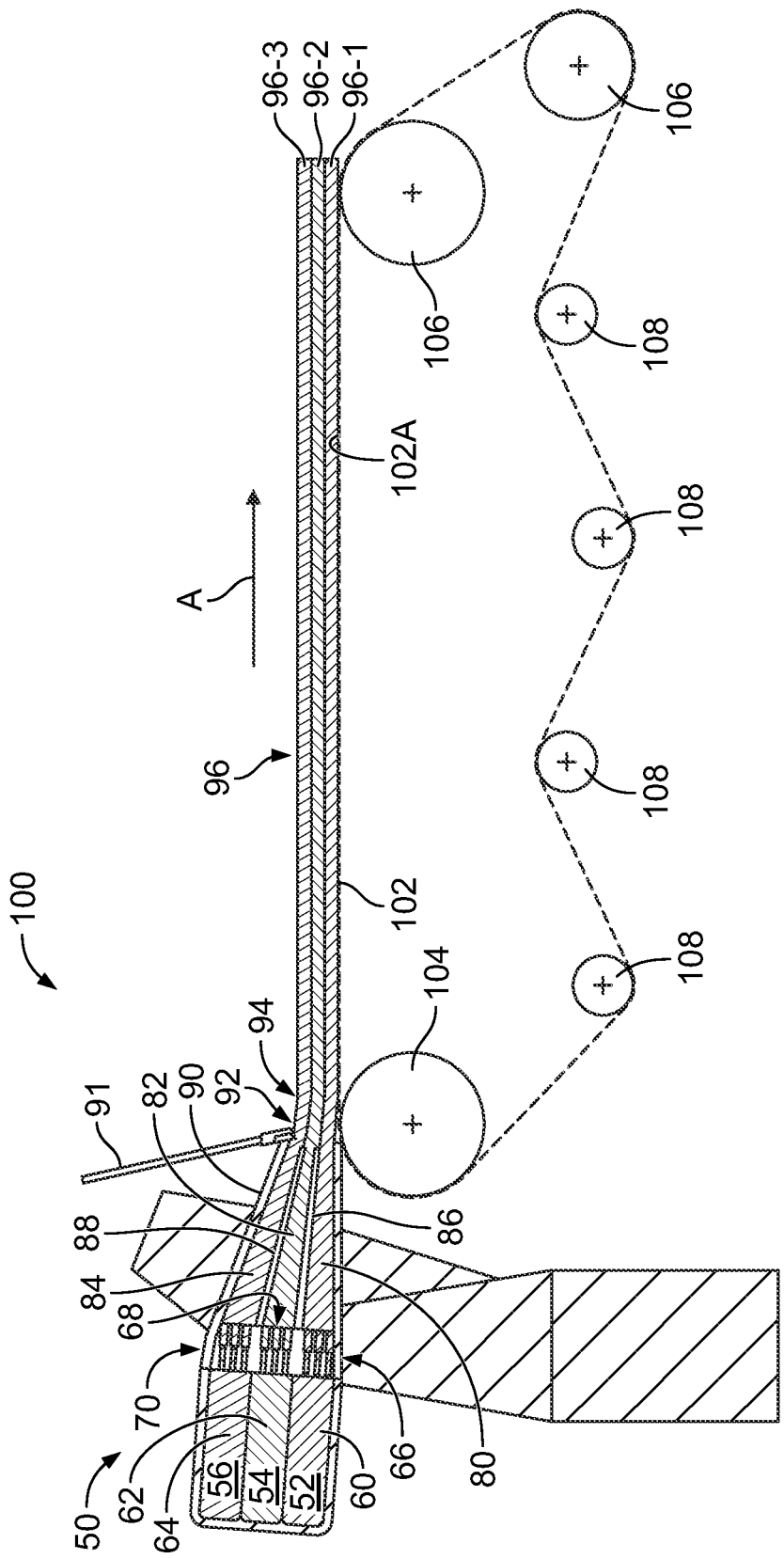
FIG. 2 is a side view of a portion of a Fourdrinier forming section of a papermaking machine with a three-layer headbox.

FIG. 1 depicts a portion of a Fourdrinier forming section 100 of a papermaking machine with a two-layer headbox 10 shown in partial cross-section. FIG. 2 depicts a similar portion of a Fourdrinier forming section 100 of a papermaking machine with a three-layer headbox 50 shown in partial cross-section, in which corresponding parts have been assigned the same reference numbers. With reference to FIGS. 1 and 2, the Fourdrinier forming section 100 comprises a forming fabric 102 that is carried by a breast roll 104, one or more driven rolls 106, and return rolls 108 back to the breast roll 104. Although two driven rolls 106 and four return rolls 108 are depicted, the Fourdrinier forming section 100 may comprise any number of driven and/or return rolls 106, 108. The forming fabric 102 may comprise an endless fabric or belt and is driven by the driven roll(s) 106 such that the forming fabric 102 rotates and an upper surface 102A of the forming fabric 102 moves in a machine direction shown by the arrow A. The terms "machine direction" or "MD" may be used herein to refer to a direction of material flow through a manufacturing process. In addition, relative placement and movement of material can be described as flowing in the machine direction through a process from upstream in the process to downstream in the process. The terms "cross-direction," "cross-machine direction," or "CD" may be used herein to refer to a direction that is generally perpendicular or transverse to the machine direction, and in the plane of the forming fabric and of the sheet that is forming.

As shown in FIG. 1, the two-layer headbox 10 may comprise a first inlet header 12 and a second inlet header 14, in which the first inlet header 12 is located below the second inlet header 14. The first inlet header 12 is supplied with a first aqueous slurry 20 comprising first fibers, and the second inlet header 14 is supplied with a second aqueous slurry 22 comprising second fibers. As described herein, the second aqueous slurry 22 may have different characteristics or properties from the first aqueous slurry 20. In particular, the second fibers may have different characteristics or properties, as compared to the first fibers. From the first inlet header 12, the first aqueous slurry 20 passes into a turbulence generator 26 comprising turbulence tubes 26-1 to 26-*n* and then into a first inlet chamber 30 in a slice cone 40. The slice cone 40 is formed at a narrowed, downstream end of the headbox 10. From the second inlet header 14, the second aqueous slurry 22 passes into a turbulence generator 28 comprising turbulence tubes 28-1 to 28-*n* and then into a second inlet chamber 32 in the slice cone 40. The first and second inlet chambers 30, 32 are defined and separated from one another via a plate 34, commonly known as a lamella. The streams of the aqueous slurries 20, 22 are maintained separately within the headbox 10 by the plate 34 until the aqueous slurries 20, 22 are combined in a region (not separately labeled) of a multi-layer headbox slice outlet 42 to define a jet 44. The jet 44 comprising the combined, yet still stratified, aqueous slurries 20, 22 is emitted from the slice outlet 42 onto the upper surface 102A of the forming fabric 102. The slice cone 40 may optionally comprise a slice adjuster 41, as shown in FIG. 1, to allow for adjustment of the size of the slice outlet 42, i.e., a slice outlet area extending in the CD (not shown; see FIG. 4) and a generally vertical direction designated by arrow V in FIG. 1.

The jet 44 forms a layer of aqueous fiber slurry 46 (also referred to as the web) on the forming fabric 102. While combining the aqueous slurries 20, 22 to form the jet 44 causes some mixing of the aqueous slurries 20, 22, it is known that the separation of the aqueous slurries 20, 22 in layers is at least partially maintained in the web 46 formed when the combined aqueous slurries 20, 22 are deposited onto the forming fabric 102. Thus, the web 46 is depicted in FIG. 1 as comprising a first layer or ply 46-1 comprising primarily the first aqueous slurry 20 and a second layer or ply 46-2 comprising primarily the second aqueous slurry 22, in which a greater percentage of the first fibers in the first aqueous slurry 20 are nearer to the forming fabric 102 than the second fibers in the second aqueous slurry 22. A paper product may then be formed from the web 46 using known methods.

As shown in FIG. 2, the three-layer headbox 50 may comprise a first inlet header 52, a second inlet header 54, and a third inlet header 56. The first inlet header 52 is the lowermost inlet header and is located below the second inlet header 54. The second inlet header 54 is located below the third inlet header 56. The first inlet header 52 is supplied with a first aqueous slurry 60 comprising first fibers, the second inlet header 54 is supplied with a second aqueous slurry 62 comprising second fibers, and the third inlet header 56 is supplied with a third aqueous slurry 64 comprising third fibers. As described herein, the first, second, and third aqueous slurries 60, 62, 64 may have different characteristics or properties, as compared to each other. From the first inlet header 52, the first aqueous slurry 60 passes into a turbulence generator 66 comprising turbulence tubes (not separately labeled; see FIG. 1) and then into a first inlet chamber 80 in a slice cone 90 that is formed at a narrowed, downstream end of the headbox 50. From the second inlet header 54, the second aqueous slurry 62 passes into a turbulence generator 68 comprising turbulence tubes (not separately labeled; see FIG. 1) and then into a second inlet chamber 82 in the slice cone 90. From the third inlet header 56, the third aqueous slurry 64 passes into a turbulence generator 70 comprising turbulence tubes (not separately labeled) and then into a third inlet chamber 84 in the slice cone 90. The first, second and third inlet chambers 80, 82 and 84 are defined and separated from one another via first and second plates or lamellae 86, 88.

With continued reference to FIG. 2, the streams of the aqueous slurries 60, 62, 64 are maintained separately within the headbox 50 by the plates 86, 88 until the aqueous slurries 60, 62, 64 exit a multi-layer headbox slice outlet 92 in a jet 94 comprising the combined, yet still stratified, aqueous slurries 60, 62, 64. The slice cone 90 may optionally comprise a slice adjuster 91, which may be used to adjust the size of the slice outlet 92 as described with respect to FIG. 1. The jet 94 forms a layer of aqueous fiber slurry 96 (also referred to as the web) on the forming fabric 102. While combining the aqueous slurries 60, 62, 64 to form the jet 94 causes some mixing of the aqueous slurries 60, 62, 64, it is known that the separation of the aqueous slurries 60, 62, 64 in layers is at least partially maintained in the web 96 formed when the combined aqueous slurries 60, 62, 64 are deposited onto the forming fabric 102. Thus, the web 96 is depicted in FIG. 2 as comprising a first layer or ply 96-1 comprising primarily the first aqueous slurry 60, a second layer or ply 96-2 comprising primarily the second aqueous slurry 62, and a third layer or ply 96-3 comprising primarily the third aqueous slurry 64. A paper product may then be formed from the web 96 using known methods.

Figure 3:
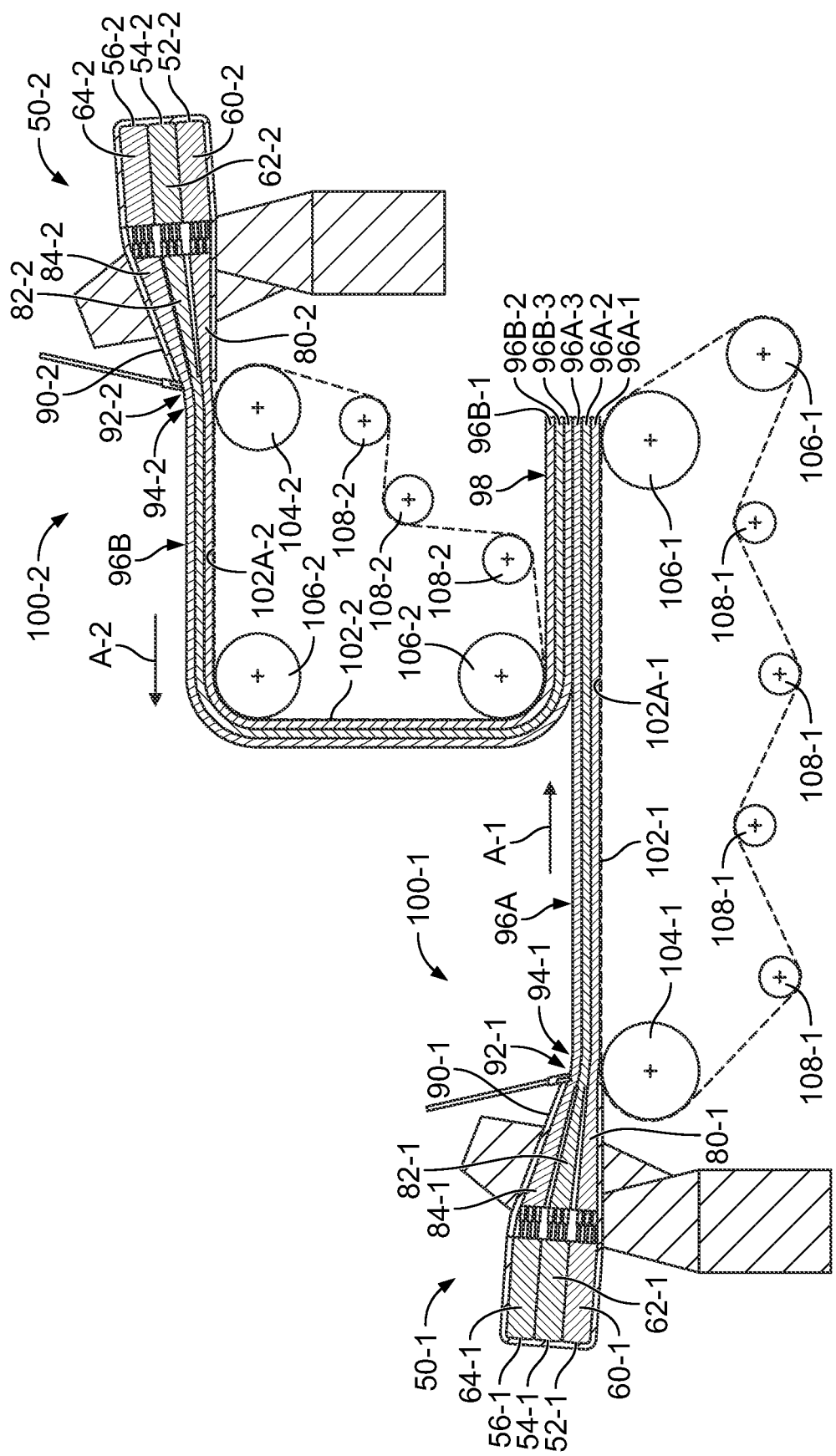
FIG. 3 is side view of a portion of two stacked Fourdrinier forming sections of a papermaking machine, in which each Fourdrinier forming section utilizes a three-layer headbox.

FIG. 3 depicts two Fourdrinier forming sections, e.g., a first Fourdrinier forming section 100-1 and a second Fourdrinier forming section 100-2, of a papermaking machine, in which the Fourdrinier forming sections 100-1, 100-2 are stacked and each comprises a respective three-layer headbox 50-1, 50-2 shown in partial cross-section. Each Fourdrinier forming section 100-1, 100-2 comprises a respective forming fabric 102-1, 102-2 that is carried by a breast roll 104-1, 104-2, one or more driven rolls 106-1, 106-2, and return rolls 108-1, 108-2 back to the breast roll 104-1, 104-2. The forming fabric 102-1, 102-2 may comprise an endless fabric or belt and is driven by the driven roll(s) 106-1, 106-2 such that an upper surface of the forming fabric 102A-1, 102A-2 moves in the MD, which is shown by the arrow A-1 in FIG. 3 for the first Fourdrinier forming section 100-1 and by the arrow A-2 for the second Fourdrinier forming section 100-2. Although the Fourdrinier forming sections 100-1, 100-2 are depicted as having two driven rolls 106-1, 106-2 and three or four return rolls 108-1, 108-2, each Fourdrinier forming section 100-1, 100-2 may comprise any number of driven and return rolls.

The headboxes 50-1, 50-2 in FIG. 3 may be substantially similar in structure to the three-layer headbox 50 depicted in FIG. 2 or to the two-layer headbox 10 depicted in FIG. 1. Labeling of some components in FIG. 3 has been omitted in order to illustrate other aspects of the Fourdrinier forming sections 100-1, 100-2 in detail. Each three-layer headbox 50-1, 50-2 may comprise a first inlet header 52-1, 52-2, a second inlet header 54-1, 54-2, and a third inlet header 56-1, 56-2. The first inlet header 52-1, 52-2 is the lowermost inlet header and is located below the respective second inlet header 54-1, 54-2. The second inlet header 54-1, 54-2 is located below the respective third inlet header 56-1, 56-2. The first inlet header 52-1, 52-2 of each headbox 50-1, 50-2 is supplied with a first aqueous slurry 60-1, 60-2 comprising first fibers, the second inlet header 54-1, 54-2 is supplied with a second aqueous slurry 62-1, 62-2 comprising second fibers, and the third inlet header 56-1, 56-2 is supplied with a third aqueous slurry 64-1, 64-2 comprising third fibers. As described herein, the first, second, and third aqueous slurries 60-1, 60-2, 62-1, 62-2, 64-1, 64-2 may have different characteristics or properties, as compared to the other aqueous slurries within the respective headbox 50-1, 50-2.

From the first inlet header 52-1, 52-2, the first aqueous slurry 60-1, 60-2 passes into a turbulence generator comprising turbulence tubes (not separately labeled; see FIGS. 1 and 2) and then into a first inlet chamber 80-1, 80-2 in a slice cone 90-1, 90-2 that is formed at a respective narrowed, downstream end of each headbox 50-1, 50-2. From the second inlet header 54-1, 54-2, the second aqueous slurry 62-1, 62-2 passes into a turbulence generator comprising turbulence tubes (not separately labeled; see FIGS. 1 and 2) and then into a second inlet chamber 82-1, 82-2 in the slice cone 90-1, 90-2. From the third inlet header 56-1, 56-2, the third aqueous slurry 64-1, 64-2 passes into a turbulence generator comprising turbulence tubes (not separately labeled) and then into a third inlet chamber 84-1, 84-2 in the slice cone 90-1, 90-2. The first, second and third inlet chambers 80-1, 80-2, 82-1, 82-2, 84-1, 84-2 are defined and separated from one another via respective first and second plates or lamellae (not labeled; see FIGS. 1 and 2).

With continued reference to FIG. 3, the streams of the aqueous slurries 60-1, 60-2, 62-1, 62-2, 64-1, 64-2 are maintained separately within the respective headboxes 50-1, 50-2 via the first and second plates (not labeled) until the aqueous slurries 60-1, 60-2, 62-1, 62-2, 64-1, 64-2 exit a multi-layer headbox slice outlet 92-1, 92-2 in a jet 94-1, 94-2. The jet 94-1 emitted from the headbox 50-1 comprises the combined, yet still stratified, aqueous slurries 60-1, 62-1, 64-1, and the jet 94-2 emitted from the headbox 50-2 comprises the combined aqueous slurries 60-2, 62-2, 64-2. The slice cone 90-1, 90-2 may optionally comprise a slice adjuster (not labeled; see FIGS. 1 and 2). Each jet 94-1, 94-2 forms a layer of aqueous fiber slurry 96A, 96B (also referred to as the first and second webs) on the respective forming fabric 102-1, 102-2. While combining the aqueous slurries 60-1, 62-1, 64-1 to form the jet 94-1 causes some mixing of the aqueous slurries 60-1, 62-1, 64-1, it is known that the separation of the aqueous slurries 60-1, 62-1, 64-1 in layers is at least partially maintained in the first web 96A formed when the combined aqueous slurries 60-1, 62-1, 64-1 are deposited onto the forming fabric 102-1. Thus, the first web 96A is depicted in FIG. 3 as comprising a first layer or ply 96A-1 comprising primarily the first aqueous slurry 60-1, a second layer or ply 96A-2 comprising primarily the second aqueous slurry 62-1, and a third layer or ply 96A-3 comprising primarily the third aqueous slurry 64-1. Similarly, the second web 96B formed from the jet 94-2 is depicted as comprising a first layer or ply 96B-1 comprising primarily the first aqueous slurry 60-2, a second layer or ply 96B-2 comprising primarily the second aqueous slurry 62-2, and a third layer or ply 96B-3 comprising primarily the third aqueous slurry 64-2.

As shown in FIG. 3, the second Fourdrinier forming section 100-2 is positioned to run "counter" to the first Fourdrinier forming section 100-1. The breast roll 104-2, the driven rolls 106-2, and the forming fabric 102-2 of the second Fourdrinier forming section 100-2 may be arranged such that second web 96B starts out in a direction that is counter or opposite to the direction of the first web 96-2. At a position downstream of the breast roll 104-2, the direction of the second web 96B is reversed such that the second web 96B is traveling in the same direction as the first web 96A. The webs 96A, 96B may then be joined or couched together to form a six-ply web 98, as shown in FIG. 3, in which the webs 96A, 96B may be joined or couched together such that the third plies 96A-3, 96B-3 of the respective webs 96A, 96B are in contact with each other and the respective first plies 96A-1, 96B-1 form an outer surface of the six-ply web 98, as described herein in more detail. A paper product may then be formed from the web 98 using known methods.

Although two- and three-layer headboxes 10, 50, 50-1, 50-2 are depicted in FIGS. 1-3, it is understood that the present invention may also be used with four-layer headboxes, five-layer headboxes, etc. Additional examples of multi-layer headboxes that may be used are disclosed in U.S. Pat. Nos. 6,544,387; 6,962,646; and 7,381,295, the disclosures of which are hereby incorporated herein by reference in their entirety.

In all embodiments, each aqueous slurry may comprise one or more different characteristics or properties, as compared to the aqueous slurry in an adjacent inlet header(s). In particular, each of the aqueous slurries may comprise fibers with a different average fiber length. One or more techniques known in the art may be used to obtain aqueous slurries comprising different average fiber lengths. The raw or input material(s) used to generate the aqueous slurries may comprise virgin materials, recycled materials, or a mixture thereof. In one example, the average fiber length may be at least partially controlled by selecting raw materials from one or more fiber bales comprising, for example, fibers obtained predominately from a particular type or species of plant (e.g., softwood vs. hardwood). Chemically manufactured (kraft pulping process) softwood fibers are typically the longest, strongest manufactured softwood fiber and may comprise fibers with an average length of, for example, about 3-4 mm. This average length includes all values and subranges therebetween, including 3.20, 3.25, 3.30, 3.35, 3.40, 3.45, 3.50, 3.55, 3.60, 3.65, 3.70, 3.75, and 3.80 mm. Hardwood fibers tend to be shorter and may comprise fibers with an average length of, for example, about 1-1.2 mm. This average length includes all values and subranges therebetween, including 1.05, 1.10, and 1.15 mm. Typical raw material dimensions may comprise, for example (depending on the geographical region of origin and the pulping method):

Softwood kraft fiber: 2.4-3.6 mm;
Softwood BCTM/TMP fibers: 1.45-2.0 mm; and
Hardwood kraft fibers: 0.9-1.1 mm.

These average lengths include all values and subranges therebetween, including 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, and 3.55 for softwood kraft fibers; 1.50, 1.55, 1.60, 1.65, 1.70, 1.75, 1.80, 1.85, 1.90, and 1.95 mm for softwood BCTM/TMP fibers; and 0.95, 1.00, and 1.05 mm for hardwood kraft fibers.

With reference to FIGS. 1-3, the first aqueous slurry 20, 60, 60-1, 60-2 may comprise fibers having the longest average length used to form a web. The first aqueous slurry 20, 60, 60-1, 60-2 may be generated, for example, by selecting raw materials containing primarily virgin softwood fibers, while the second aqueous slurry 22, 62, 62-1, 62-2 and the third aqueous slurry 64, 64-1, 64-2 may each be generated by selecting raw materials containing primarily virgin hardwood fibers. As is known in the art, the first, second, and third aqueous slurries may each be generated using a separate pulp slurry (not shown) that is supplied to each respective inlet header from a separate stock tank (not shown).

Alternatively, or in addition, fractionation may be used to screen and separate the fibers in the pulp slurry by size into a short fiber ("SF") fraction and a long fiber ("LF") fraction. For example, fractionation may be used where the raw material comprises a recycled material, e.g., old corrugated containers, newspapers, magazines, etc., and/or materials with a higher degree of variability in fiber length. Recycled materials may comprise fibers with a length of, for example, from 0.9-2.7 mm. This average length includes all values and subranges therebetween, including 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, and 2.65 mm. With reference to FIGS. 1-3, the first aqueous slurry 20, 60, 60-1, 60-2 may comprise the LF stream(s) obtained following one or more fractionation steps, while the second aqueous slurry 22, 62, 62-1, 62-2 and the third aqueous slurry 64, 64-1, 64-2 may each comprise the SF stream(s) obtained following the one or more fractionation steps. As is known in the art, the first, second, and third aqueous slurries may each be generated by fractionating one or more pulp slurries (not shown) supplied from one or more stock tanks (not shown), with the resulting SF and LF streams being supplied to the appropriate inlet headers.

Furthermore, one or more additives may be used to, for example, alter an amount of free fines in the aqueous slurry, increase the strength of the finished paper product, etc. The fibers may also undergo one or more additional pre- or post-screening steps, such as cleaning, dispersion, and/or refining.

In all examples, the first aqueous slurry 20, 60, 60-1, 60-2 in FIGS. 1-3, i.e., the portion of the web 46, 96, 96A, 96B that is in contact with the upper surface 102A, 102A-1, 102A-1, of the forming fabric 102, 102-1, 102-2, comprises first fibers with a first (longest) average length, and the second aqueous slurry 22, 62, 62-1, 62-2 comprises second fibers with a second average length that is less than the first average length. With reference to FIGS. 2 and 3, when a third inlet header 56, 56-1, 56-2 is present, the third aqueous slurry 64, 64-1, 64-2 may comprise third fibers with a third average length. In some particular instances, the third average length may be less than the first average length. In other particular instances, the third average length may be less than both the first and second average lengths. For example, the first fibers in the first aqueous slurry 20, 60, 60-1, 60-2 may comprise fibers that are about three times as long as the second and/or third fibers, such as when the first aqueous slurry 20, 60, 60-1, 60-2 comprises softwood fibers and the second and/or third aqueous slurries 22, 62, 62-1, 62-2, 64, 64-1, 64-2 comprise hardwood fibers. In further particular instances, with reference to the embodiment shown in FIG. 2, the third average length may be substantially the same as or greater than the first average length, as described herein.

With reference to FIGS. 1-3, when the aqueous slurries are combined to form the respective jets 44, 94, 94-1, 94-2 and deposited onto the forming fabric 102, 102-1, 102-2, a majority of the fibers in each layer or ply of the resulting webs 46, 96, 96A, 96B are more dominantly aligned in the MD, as depicted by the respective arrows A, A-1, A-2. Cross-directional oscillation of the forming fabric 102, 102-1, 102-2, i.e., oscillation of the forming fabric in a direction that is transverse or substantially perpendicular to the MD, may be used to improve a formation of a finished paper product by inducing hydrodynamic and mechanical shear forces in the web 46, 96, 96A, 96B on the forming fabric 102, 102-1, 102-2. In particular, because the first ply 46-1, 96-1, 96A-1, 96B-1 of each web 46, 96, 96A, 96B comprising primarily the first aqueous slurry 20, 60, 60-1, 60-2 with the first (longest average length) fibers is in contact with the forming fabric 102, 102-1, 102-2, it is believed that the first fibers are subjected to the greatest amount of transverse shear forces.

Figure 4:
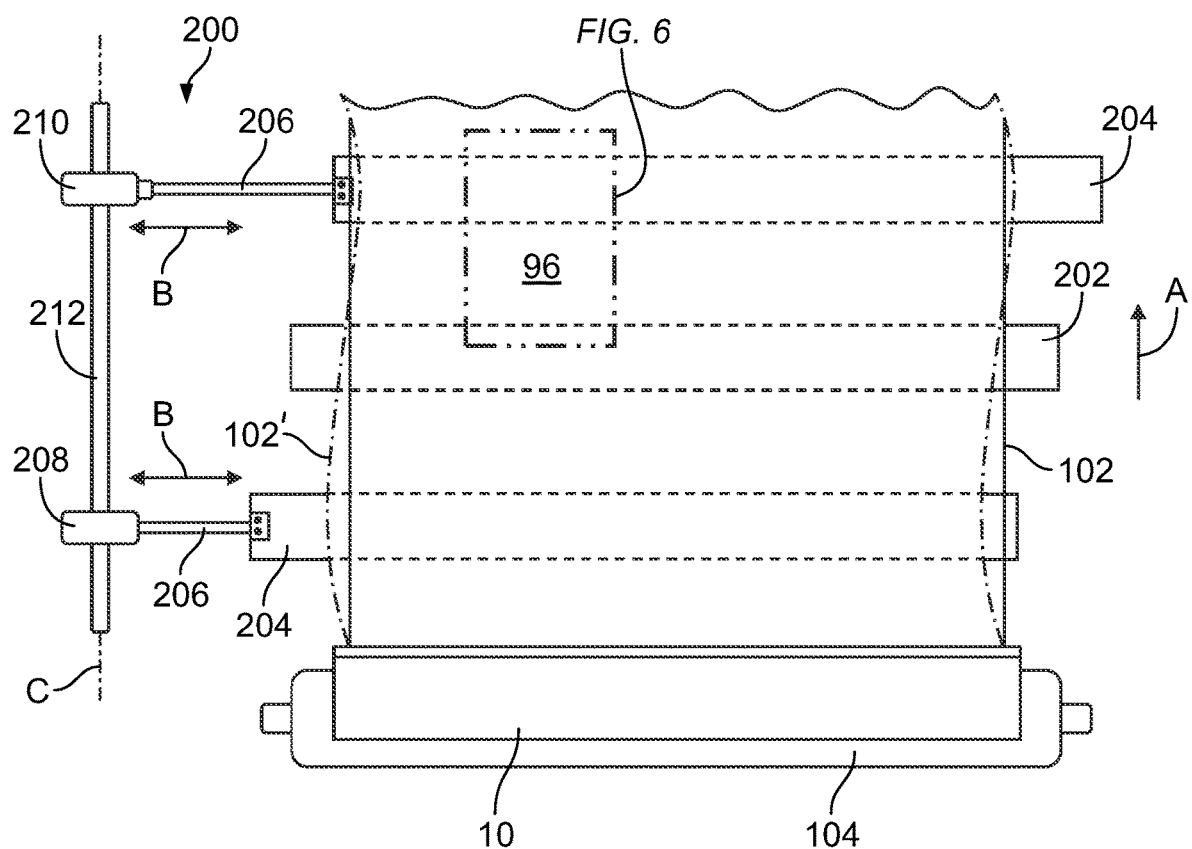
FIG. 4 is a top view of an upstream portion of a Fourdrinier forming section of a papermaking machine comprising a paper machine shake apparatus, known as a table shake.

Transverse or cross-directional oscillation of the forming fabric 102, 102-1, 102-2 in any of the embodiments depicted in FIGS. 1-3 may be achieved by one or more structures known in the art. In one example, as shown in FIG. 4, a fiber alignment structure comprising a paper machine table shake apparatus 200 causes the forming fabric 102 to oscillate in a direction transverse to the MD, i.e., the forming fabric 102 oscillates in the CD. The paper machine table shake apparatus 200 may be used with a breast roll 104 and a headbox 10, which may be any of the embodiments described herein, including the embodiment shown in FIG. 3 comprising two Fourdrinier forming sections. The paper machine table shake apparatus 200 may comprise a plurality of T-bars 202, 204 and a side frame (not shown), in which alternating ones of the T-bars are fixed to the side frame, e.g., T-bars 202, or are movable relative to the side frame in the direction indicated by an arrow B, e.g., T-bars 204. The paper machine table shake apparatus 200 is described in more detail in U.S. Pat. No. 4,055,460, the disclosure of which is hereby incorporated herein by reference in its entirety.

With continued reference to FIG. 4, the movable T-bars 204 may be mounted by rods 206 to eccentrics 208, 210, which are mounted to a shaft 212. Rotation of the shaft 212 about a longitudinal axis C causes the eccentrics 208, 210 to rotate, which causes the movable T-bars 204 to slide, i.e., move back and forth, from side to side in the direction indicated by arrow B. Arrow B is transverse to, i.e., substantially perpendicular to, the MD, which is represented by the arrow A. In some instances, as shown in FIG. 3, adjacent eccentrics 208, 210 may be set at 180º to each other, such that adjacent ones of the movable T-bars 204 will move side to side in opposite directions due to the action of the eccentrics 208, 210. In other instances (not shown), the eccentrics 208, 210 may be set in phase with each other such that the movable T-bars 204 move side to side in unison.

In all instances, the motion of the eccentrics 208, 210 causes the forming fabric 102 to oscillate laterally about the fixed T-bars 202. Friction between the forming fabric 102 and the T-bars 202, 204 allows the oscillation of the movable T-bars 204 to be transmitted to the forming fabric 102 and to the web 96 formed on the forming fabric 102, as described in more detail with respect to FIG. 6. A normal (straight) position of the forming fabric 102 without use of the paper machine table shake apparatus 200 is depicted in FIG. 4 with a solid line, while a position of the forming fabric 102' in motion (with exaggeration) during use of the paper machine table shake apparatus 200 is depicted with a dotted line.

Figure 5:
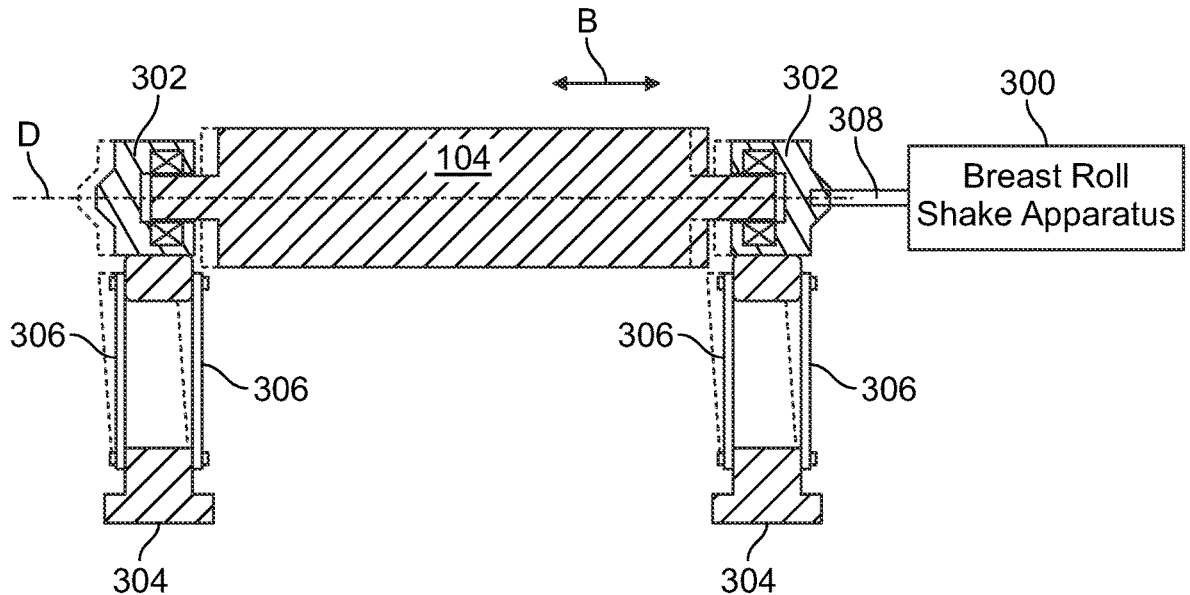
FIG. 5 is a partial cross-sectional view of a breast roll comprising one style of breast roll shake apparatus.

In another example, a breast roll shake apparatus 300, which is shown in partial cross-section in FIG. 5, may be used with any of the embodiments described herein (including the embodiment shown in FIG. 3 comprising two Fourdrinier forming sections) to induce cross-directional oscillation of a forming fabric (not shown; see FIGS. 1-4). The breast roll shake apparatus 300 is described in more detail in U.S. Pat. No. 5,560,808, the disclosure of which is hereby incorporated herein by reference in its entirety. With reference to FIG. 5, a breast roll 104 is rotatably supported within bearing mounts 302, which are connected to a fixed portion 304 via a movable element 306. In some examples, the movable element 306 may comprise fiberglass springs. One of the bearing mounts 302 is coupled to the breast roll shake apparatus 300 via an arm 308. The breast roll shake apparatus 300 may comprise one or more hydraulic ram assemblies (not shown) that cause the arm 308, the bearing mounts 302, the breast roll 104, and the movable elements 306 to move side to side in a direction indicated by arrow B, which is transverse to the MD (not shown; see FIGS. 1-4) and generally parallel to an axis D of the breast roll 104. The dashed lines in FIG. 5 indicate the position of the breast roll 104, the bearing mounts 302, and the movable elements 306 when moved back and forth by the breast roll shake apparatus 300 via the arm 308. Similar to the paper machine table shake apparatus 200 depicted in FIG. 4, the side-to-side movement of the breast roll 104 in FIG. 5 causes the forming fabric (not shown; see FIGS. 1-4) to oscillate laterally as the forming fabric passes over the breast roll 104. In some embodiments (not shown), the paper machine table shake apparatus 200 of FIG. 4 and the breast roll shake apparatus 300 of FIG. 5 may be used together in a single Fourdrinier forming section.

In all embodiments, it is believed that the transverse or cross-directional oscillation of the forming fabric as described herein causes at least a portion of the fibers within the web to become aligned more in a direction that deviates from the MD, with the fibers closest to the forming fabric generally being subjected to a greatest amount of the transverse shearing forces such that these fibers become aligned in a direction that is most biased away from the MD. In the prior art, when a single layer headbox is used in conjunction with the cross-directional oscillation of the forming fabric or the aqueous slurries of each layer in a multi-layer headbox are of the same composition, it is believed that the longest fibers are generally equally distributed throughout an entire thickness of the web and of a finished paper product formed from the web (see FIGS. 6 and 7). The longest fibers are generally the strongest fibers in terms of providing the desired strength and bending stiffness properties in the finished paper product. When the forming fabric is subjected to cross-directional oscillation, because all layers have generally an equal amount of the longest fibers, only a limited number of the longest fibers in the web, i.e., only those fibers nearest to the forming fabric, would receive transverse shearing forces of sufficient magnitude to cause those fibers to align in a direction that deviates from the MD.

Most of the remaining longest fibers would be generally aligned in the MD.

In the present disclosure, it is believed that the first layer or ply nearest the forming fabric will comprise a significant amount of the longest fibers provided in the web and further that a significant portion of the longest fibers will become aligned, positioned, or oriented in a direction that deviates from the MD. As described herein with respect to FIGS. 1 and 2, the lowermost stock inlet header, i.e., the first inlet header 12, 52, of the respective multi-layer headbox 10, 50 is supplied with the first aqueous slurry 20, 60 comprising the first fibers having an average length greater than that of the fibers of the aqueous slurry provided to at least the inlet header located above the first inlet header (e.g., the second inlet header 14, 54). While combining the aqueous slurries to form the respective jet 44, 94 causes some mixing of the aqueous slurries, it is known that the separation of the aqueous slurries is at least partially maintained in the respective web 46, 96 formed when the combined aqueous slurries are deposited onto the forming fabric 102, such that the web 46, 96 comprises two or more plies or strata. Thus, it is believed that the first layer or ply 46-1, 96-1 of each web 46, 96 will generally comprise fibers with an average length greater than that of a first layer or ply formed in accordance with prior art processes. Likewise, with reference to FIG. 3, the lowermost inlet header, i.e., the first inlet header 52-1, 52-2, of each respective headbox 50-1, 50-2 is supplied with the first aqueous slurry 60-1, 60-2 comprising the first, longer fibers, such that the first layer or ply 96A-1, 96B-1 of each respective web 96A, 96B that is closest to the respective forming fabric 102-1, 102-2 will generally comprise fibers having a greater average length.

Figure 6:
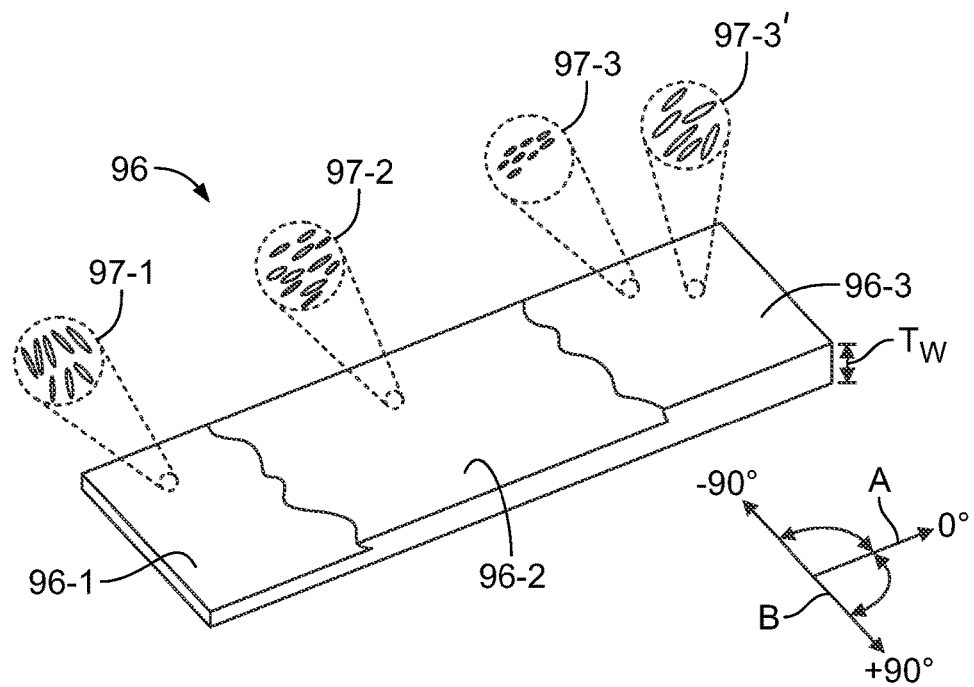
FIG. 6 is a perspective view of a section of a three-ply web, formed in accordance with the present disclosure.

FIG. 6 is a plan view of a section of a three-ply web 96 from FIG. 4 formed in accordance with the present disclosure, in which portions of the second and third plies 96-2, 96-3 have been cut away. The web 96 may be similar to the three-ply web 96 depicted in FIG. 2 and may comprise a thickness Tw that extends generally perpendicular to both the MD and the CD.

In FIG. 6, the MD is shown by arrow A and the CD is shown by arrow B. The insets represent idealized views of first, second, and third fibers 97-1, 97-2, 97-3, 97-3' located in the first, second, and third plies 96-1, 96-2, 96-3, respectively, of the web 96 following transverse oscillation of the forming fabric, as described herein. As shown in FIG. 6, the first fibers 97-1 comprise a first average length, and the second fibers 97-2 comprise a second average length, in which the first average length is greater than the second average length. The third fibers 97-3, 97-3' comprise a third average length. In some instances, the third average length of the third fibers, e.g., fibers 97-3, is less than one or both of the first and second average lengths. In other instances, the third average length of the third fibers, e.g., fibers 97-3', is equal to or greater than the first average length of the first fibers 97-1.

Also as shown in FIG. 6, a significant portion of the first fibers 97-1 are caused to be aligned at an angle relative to the MD. In some instances, it is believed that at least a majority (>50%) of the first fibers 97-1 become aligned at an angle relative to the MD. Because the second and third fibers 97-2, 97-3, 97-3' located in the second and third plies 96-2, 96-3 are further away from the forming fabric, it is believed that the second and third fibers 97-2, 97-3, 97-3' will be affected by the transverse shearing forces to a much lesser degree and will exhibit a greatly reduced amount of deviation relative to the MD, as compared to the first fibers 97-1.

The number of first fibers 97-1 extending at an angle to the MD and the magnitude of the angles at which the first fibers 97-1 extend relative to the MD may vary based on the magnitude and frequency of the shear forces applied by the forming fabric to the first fibers 97-1, as well as the speed of movement of the forming fabric in the MD and CD. It is believed that the angles at which the first fibers 97-1 may extend relative to the MD may range from +1 degree to +90 degrees and −1 degree to −90 degrees, with the MD defining 0 degree, as shown in FIG. 6. For example, the deviation of the first fibers 97-1 relative to the MD direction may be >0 degrees and ≤90 degrees. These ranges include all values and subranges therebetween, including +5, +10, +15, +20, +25, +30, +35, +40, +45, +50, +55, +60, +65, +70, +75, +80, and +85 degrees and −5, −10, −15, −20, −25, −30, −35, −40, −45, −50, −55, −60, −65, −70, −75, −80, and −85 degrees.

Although the web 96 shown in FIG. 6 comprises three plies, these principles are believed to apply equally to webs comprising two plies (e.g., the web 46 depicted in FIG. 1), four plies, etc. In addition, these principles are also believed to apply to embodiments such as that depicted in FIG. 3 in which two three-ply webs 96A, 96B formed in separate Fourdrinier forming sections 100-1, 100-2 are combined to form one six-ply web 98.

In all embodiments, by causing a significant portion of the first fibers to be aligned at an angle relative to the MD, it is believed that the cross-directional tensile and compressive strengths of a paper product formed from the web will be increased, as compared to a paper product formed in accordance with prior art processes. In particular, with reference to FIG. 6, it is believed that alignment of a significant amount of the first, longest fibers 97-1 in a direction that deviates from the MD may cause a decrease in a ratio of MD tensile and/or compressive strengths to CD tensile and/or compressive strengths of a finished paper product formed in accordance with the present disclosure. Paper products formed using conventional papermaking processes typically have much greater MD tensile and compressive strengths, as compared to the CD tensile and compressive strengths, and consequently higher ratios of MD to CD tensile and compressive strengths, which is due at least in part to a tendency of the fibers to be aligned in the MD. It is believed that paper products formed using the methods disclosed herein may comprise a reduced ratio of MD to CD tensile and/or compressive strengths, as compared to paper products formed using conventional processes, due at least in part to the alignment of a significant portion of the longest fibers 97-1 at an angle relative to the MD.

Figure 7A:
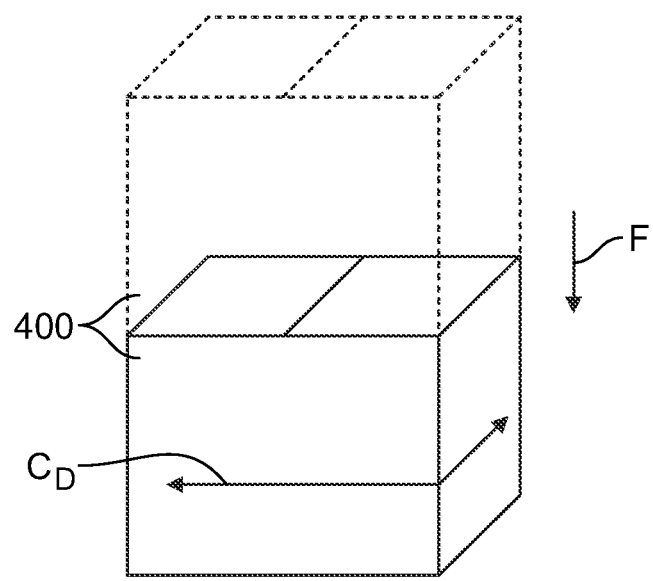
FIGS. 7A and 7B are perspective views of stacked boxes.
Figure 7B:
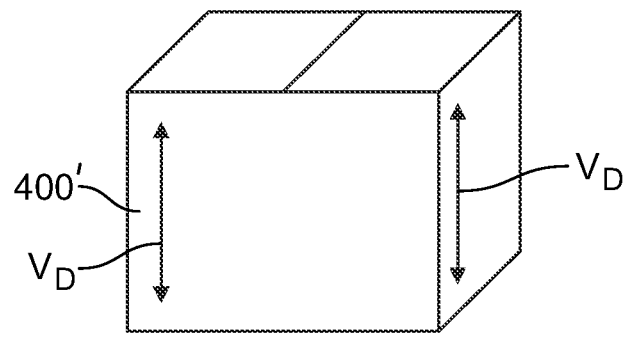

In addition, it is believed that paper products formed in accordance with the present disclosure will exhibit increased compressive strength, and, in particular, increased stacking strength of a box or other container formed from the paper product. With reference to FIG. 7A, stacked boxes 400 are subjected to a compression force, as shown by arrow F. Because of the tendency of the fibers to align in the MD and the constraints of conventional box-making machines, boxes 400 formed from conventional paper products as shown in FIG. 7A typically have the greatest amount of compressive strength in a circumferential direction, as indicated by arrow $C_D$. Because conventional boxes exhibit the greatest amount of compressive strength in a direction that is substantially perpendicular to the direction of the compression force F, these boxes may be more prone to weakening and collapse. It is believed that the methods disclosed herein help to solve this problem by causing at least a portion of the longest fibers to be aligned at an angle relative to the MD, which increases the compressive strength, particularly the stacking strength of boxes formed from these paper products. As shown in FIG. 7B, it is believed that a box 400' formed from a paper product made in accordance with the present disclosure will have increased compressive strength in a vertical direction, as indicated by arrows $V_D$, which is substantially parallel to the direction of the compression force F.

Figure 8:
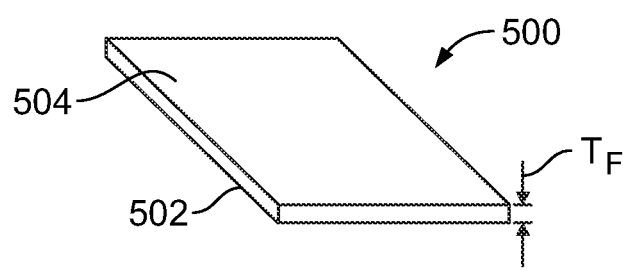
FIG. 8 is a perspective view of an exemplary finished paper product.

Furthermore, it is believed that paper products formed in accordance with the present disclosure will also exhibit increased bending stiffness, as compared to paper products formed using conventional processes. FIG. 8 depicts an exemplary finished paper product 500 formed in accordance with the present disclosure. The paper product 500 comprises a first outer surface 502, a second opposing outer surface 504, and a thickness $T_F$. The paper product 500 may be formed from a web comprising two or more layers or plies as described herein and may comprise, for example, paper or paperboard. With reference to FIGS. 1, 6, and 8, the first layer or ply 46-1, 96-1 closest to the forming fabric 102 comprises primarily the first aqueous slurry 20 containing the first, longest fibers 97-1, and the second layer or ply 46-2, 96-2 comprises primarily the second aqueous slurry 22 containing the second, shorter fibers 97-2. It is believed that a majority of the fibers located at or near one outer surface, e.g., the first outer surface 502, of the finished paper product 500 will comprise the longest, first fibers 97-1 from the first layer or ply 46-1, 96-1, while a majority of the fibers located toward an opposing outer surface, e.g., the second outer surface 504, will comprise the second fibers 97-2 from the second layer or ply 46-2, 96-2. At least a portion of the first fibers 97-1 may be biased away from a direction in which the majority of the second fibers 97-2 are aligned, as described herein. For example, a majority of the second fibers 97-2 may be aligned in the MD, and a majority of the first fibers 97-1 may be aligned in a direction that deviates from the MD. In some instances, as shown in FIG. 1, the second layer or ply 46-2, 96-2 may comprise the final layer or ply of the web 46, 96, and in other instances, one or more additional layers or plies may be formed above the second layer or ply 46-2, 96-2 (see FIGS. 2 and 3). The longest fibers typically provide greater bending stiffness, and it is believed that a paper product 500 formed in accordance with FIG. 1 such that the longest, first fibers 97-1 are located at or near one outer surface 502 will exhibit increased bending stiffness, as compared to a paper product formed in accordance with prior art processes in which the longest fibers are generally equally distributed throughout the thickness $T_F$ of the paper product.

It is believed that a paper product 500 formed from a web 96, 96A, 96B comprising three or more plies as shown in FIGS. 2 and 3 will also exhibit an increase in bending stiffness. With reference to FIGS. 2, 6, and 8, the first layer or ply 96-1 closest to the forming fabric 102 comprises primarily the first aqueous slurry 60 containing the first fibers 97-1; the second, middle layer or ply 96-2 comprises primarily the second aqueous slurry 62 containing the second fibers 97-2; and the third, outer layer or ply 96-3 comprises primarily the third aqueous slurry 64 containing the third fibers 97-3, 97-3'. It is believed that a majority of the fibers located at or near one outer surface, e.g., the first outer surface 502, of the finished paper product 500 will comprise the longest, first fibers 97-1 from the first layer or ply 96-1. A majority of the fibers located toward an opposing surface, e.g., the second outer surface 504, will comprise the second fibers 97-2 from the second layer or ply 96-2, and a majority of the fibers located at or near the opposing surface 504 will comprise the third fibers 97-3, 97-3' from the third layer or ply 96-3, in which at least a portion of the second fibers 97-2 are sandwiched between the first and third fibers 97-1, 97-3, 97-3'.

With continued reference to FIGS. 2, 6, and 8, in some examples as described herein, the third average length of the third fibers, e.g., fibers 97-3 in FIG. 6, may be less than the first average length of the first fibers 97-1, and in other examples, the third average length may be less than both the first and second average lengths of the first and second fibers 97-1, 97-2. In both examples, the second average length is less than the first average length, and it is believed that the first fibers 97-1, i.e., the fibers with the longest average length, will be located at or near one outer surface, e.g., the first outer surface 502, of the paper product 500 such that the paper product 500 will exhibit increased bending stiffness (as compared to a conventional paper product) as described above with respect to FIG. 1. In other examples, the third average length of the third fibers, e.g., fibers 97-3' in FIG. 6, may be equal to or greater than the first average length, such that both outer surfaces 502, 504 of the paper product 500 comprise fibers with an average length that is greater than the average length of the fibers located within the paper product 500. It is believed that this paper product 500 with longer fibers located at or near both outer surfaces 502, 504 may exhibit increased bending stiffness, as compared to conventional paper products. It is believed that these paper products may also exhibit greater bending stiffness than paper products 500 described herein in which the longest fibers are located at or near only one outer surface 502.

With reference to FIGS. 3, 6, and 8, the first layer or ply 96A-1, 96B-1 closest to the respective forming fabric 102-1, 102-2 comprises primarily the first aqueous slurry 60-1, 60-2 containing the longest, first fibers 97-1; the second, middle layer or ply 96A-2, 96B-2 comprises primarily the second aqueous slurry 62-1, 62-2 containing the second, shorter fibers 97-2; and the third, outer layer or ply 96A-3, 96B-3 comprises primarily the third aqueous slurry 64-1, 64-2 containing the third, shorter fibers, e.g., fibers 97-3 in FIG. 6. The second average length of the second fibers 97-2 is less than the first average length of the first fibers 97-1, and the third average length of the third fibers 97-3 may be less than one or both of the first and second average lengths of the first and second fibers 97-1, 97-2. In the finished paper product 500, the webs 96A, 96B may be combined such that it is believed that a majority of the fibers located at or near one outer surface, e.g., the first outer surface 502, of the finished paper product 500 will comprise the first fibers 97-1 from the first layer or ply 96A-1 of the first web 96A, and a majority of the fibers located at or near the opposing outer surface, e.g., the second outer surface 504, of the finished paper product 500 will comprise the first fibers 97-1 from the first layer or ply 96B-1 of the second web 96B. At least a portion of the second fibers 97-2 from the respective second layers or plies 96A-2, 96B-2 and the third fibers 97-3 from the respective third layers or plies 96A-3, 96B-3 of each web 96A, 96B are sandwiched between the first fibers 97-1 of the first layers or plies 96A-1, 96B-1. Because the first fibers 97-1 comprise the fibers with the longest average length, it is believed that both outer surfaces 502, 504 of a paper product 500 formed using the embodiment shown in FIG. 3 will comprise fibers with an average length that is greater than the average length of the fibers located within the paper product 500. As described with respect to FIG. 2, it is believed that paper products 500 with longer fibers located at or near both outer surfaces 502, 504 may exhibit increased bending stiffness, as compared to conventional paper products and also to paper products 500 described herein in which the longest fibers are located at or near only one outer surface 502.

In all examples, due to the alignment of the first, longest fibers at an angle relative to the MD, alone or in combination with the location of the longest fibers at or near one or both outer surfaces of the finished paper product, it is believed that a paper product according to the present disclosure may be formed from a smaller amount of raw material, as compared to a conventional paper product, while still retaining substantially the same properties as the conventional paper product. For example, a paper product formed in accordance with the present disclosure may exhibit a decrease of n percent in a ratio of MD to $C_D$ tensile strength (where n is any positive number), as compared to a paper product formed using a conventional process. Thus, it is believed that a paper product formed in accordance with the present disclosure using about n percent less in raw material (e.g., n percent fewer fibers), as compared to the conventional paper product, may have a ratio of MD to $C_D$ tensile strength that is similar to or lower than the ratio of MD to $C_D$ tensile strength of the conventional paper product. It is believed that other properties, such as compressive strength and bending stiffness, of paper products formed in accordance with the present disclosure may be similarly maintained at the level of a conventional paper product, while reducing the required amount of raw material.

Figure 9:
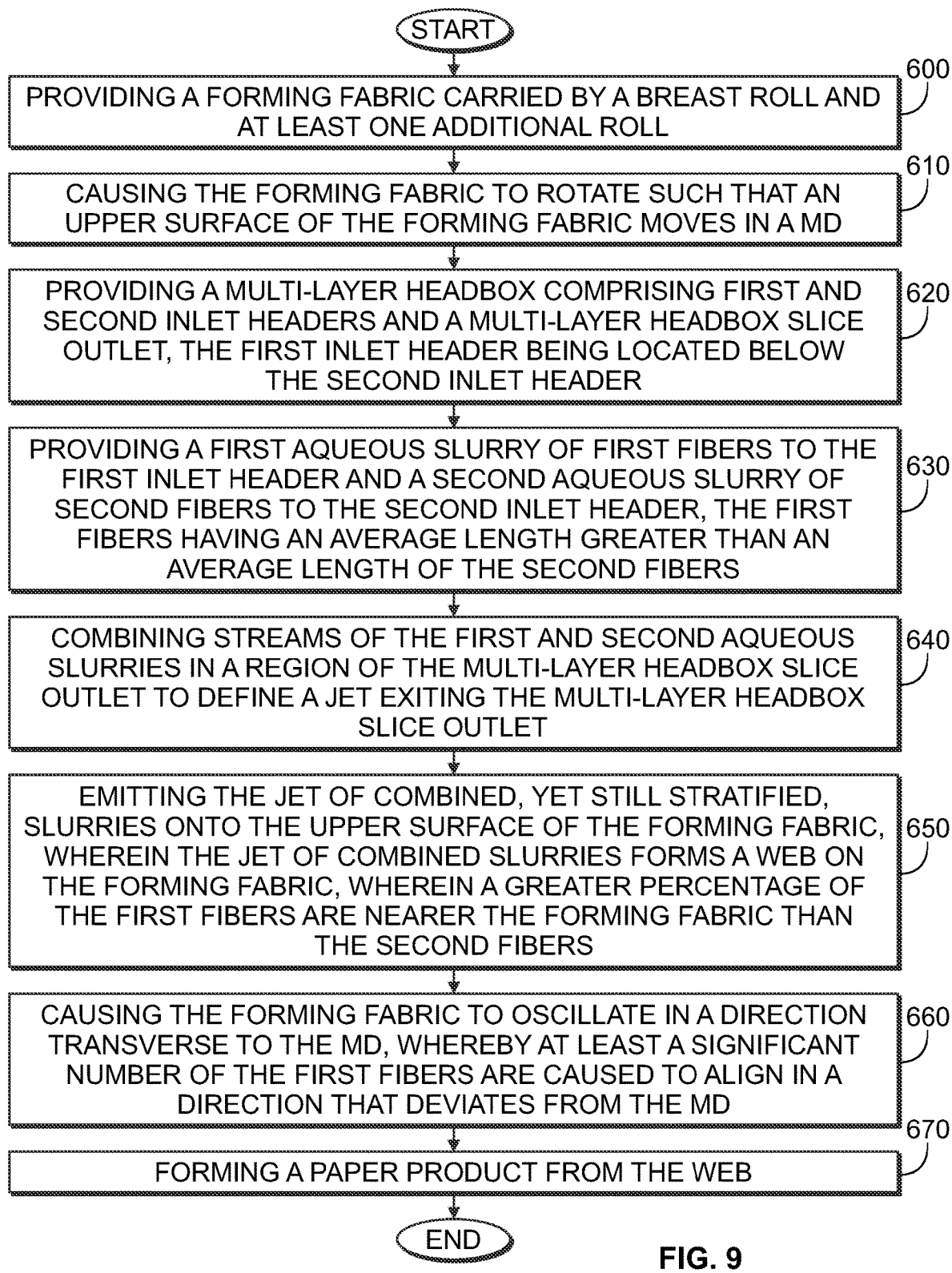
FIG. 9 is a flowchart illustrating an exemplary process for making a paper product.

FIG. 9 is a flowchart illustrating an exemplary process for making a paper product. Although reference is made to the components of the two-layer headbox 10 in FIG. 1, it is understood that the method is not limited only to this structure. The method may begin at Step 600 with providing a forming fabric 102 carried by a breast roll 104 and at least one additional roll 106. The method may continue at Step 610 with causing the forming fabric 102 to rotate such that an upper surface 102A of the forming fabric 102 moves in a machine direction (as indicated by arrow A in FIG. 1). In some examples, the at least one additional roll may comprise a driven roll 106, and causing the forming fabric 102 to rotate may comprise driving the driven roll 106. At Step 620, a multi-layer headbox 10 comprising first and second inlet headers 12, 14 and a multi-layer headbox slice outlet 42 is provided, in which the first inlet header 12 is located below the second inlet header 14. At Step 630, a first aqueous slurry 20 of first fibers is provided to the first inlet header 12 and a second aqueous slurry 22 of second fibers is provided to the second inlet header 14, in which the first fibers have an average length greater than an average length of the second fibers (see FIG. 6).

The method may continue at Step 640 with combining streams of the first and second aqueous slurries 20, 22 in a region of the multi-layer headbox slice outlet 42 to define a jet 44 exiting the multi-layer headbox slice outlet 42. At Step 650, the jet 44 of the combined, yet still stratified, slurries 20, 22 is emitted onto the upper surface 102A of the forming fabric 102. The jet 44 of combined slurries forms a web 46 on the forming fabric 102, in which a greater percentage of the first fibers are nearer the forming fabric 102 than the second fibers. At Step 660, the forming fabric 102 is caused to oscillate in a direction transverse to the machine direction (see FIGS. 4 and 5), whereby at least a significant number of the first fibers are caused to align in a direction that deviates from the machine direction (see FIG. 6). At Step 670, the paper product (see FIG. 8) is formed from the web 46, after which the method may terminate. The paper product made by the process may comprise, for example, paper or a paperboard.

In some aspects, the process may further comprise maintaining the streams of the first and second aqueous slurries 20, 22 separate from one another as the first and second aqueous slurries 20, 22 move from the first and second inlet headers 12, 14 to the region of the multi-layer headbox slice outlet 42.

In one example, causing the forming fabric 102 to oscillate in Step 660 may comprise applying oscillating movement to a fiber alignment structure (e.g., a paper machine table shake apparatus 200 as shown in FIG. 4) in contact with the forming fabric 102. In another example, causing the forming fabric 102 to oscillate in Step 660 may comprise causing the breast roll 104 to move in a direction generally parallel to an axis of the breast roll 104 (e.g., via a breast roll shake apparatus 300 as shown in FIG. 5). In a further example, the forming fabric 102 may be oscillated to cause the significant number of first fibers to align in a direction extending from between >0 and ≤90 degrees relative to the machine direction (see FIG. 6). The first fibers may align relative to the MD from +1 degree to +90 degrees and −1 degree to −90 degrees, with the MD defining 0 degree. These ranges include all values and subranges therebetween, including +5, +10, +15, +20, +25, +30, +35, +40, +45, +50, +55, +60, +65, +70, +75, +80, and +85 degrees and −5, −10, −15, −20, −25, −30, −35, −40, −45, −50, −55, −60, −65, −70, −75, −80, and −85 degrees.

In other aspects, with reference to FIG. 2, the multi-layer headbox 50 may further comprise a third inlet header 56 located above the second inlet header 54, and the process may further comprise: providing a third aqueous slurry 64 of third fibers to the third inlet header 56; and combining a stream of the third aqueous slurry 64 with the streams of the first and second aqueous slurries 60, 62 in the region of the multi-layer headbox slice outlet 92 to define the jet 94 exiting the multi-layer headbox slice outlet 92 (see also FIG.

3). In some examples, the third fibers may have an average length that is less than the average length of the first fibers (see FIG. 6). In other examples, the third fibers may have an average length that is equal to or greater than the average length of the first fibers (see FIG. 6).

As used throughout, ranges are used as a short hand for describing each and every value that is within the range, including all subranges therein.

While particular embodiments of the present invention have been illustrated and described, it should be understood that various changes and modifications may be made without departing from the spirit and scope of the invention. It is therefore intended to cover in the appended claims all such changes and modifications that are within the scope of this invention.

What is claimed is:

1. A process for making a multilayer paper product, the process comprising:
    providing a forming fabric carried by a breast roll and at least one additional roll;
    causing the forming fabric to rotate such that an upper surface of the forming fabric moves in a machine direction;
    providing a multilayer headbox comprising first and second inlet headers and a multilayer headbox slice outlet, the first inlet header being located below the second inlet header;
    providing a first aqueous slurry of first fibers to the first inlet header and a second aqueous slurry of second fibers to the second inlet header, the first fibers having an average length greater than an average length of the second fibers;
    combining streams of the first and second aqueous slurries in a region of the multilayer headbox slice outlet to define a jet exiting the multilayer headbox slice outlet;
    emitting the jet of combined, yet still stratified, slurries onto the upper surface of the forming fabric, wherein the jet of combined slurries forms a web on the forming fabric, wherein a greater percentage of the first fibers are nearer the forming fabric than the second fibers;
    causing the forming fabric to oscillate in a direction transverse to the machine direction, whereby a majority of the first fibers are caused to be biased toward a cross-machine direction without causing a majority of the second fibers to become aligned away from a machine direction; and
    forming the multilayer paper product from the web.

2. The process of claim 1, wherein:
    the at least one additional roll comprises a driven roll; and
    causing the forming fabric to rotate comprises driving the driven roll.

3. The process of claim 1, further comprising:
    maintaining the streams of the first and second aqueous slurries separate from one another as the first and second aqueous slurries move from the first and second inlet headers to the region of the multilayer headbox slice outlet.

4. The process of claim 1, wherein causing the forming fabric to oscillate comprises applying oscillating movement to a fiber alignment structure in contact with the forming fabric.

5. The process of claim 1, wherein causing the forming fabric to oscillate comprises causing the breast roll to move in a direction generally parallel to an axis of the breast roll.

6. The process of claim 1, wherein the majority of the first fibers are aligned in a direction extending from between >0 and ~90 degrees relative to the machine direction.

7. The process of claim 1, wherein the multilayer paper product comprises paper.

8. The process of claim 1, wherein the multilayer paper product comprises a paperboard.

9. The process of claim 1, wherein the multilayer headbox further comprises a third inlet header located above the second inlet header, the process further comprising:
    providing a third aqueous slurry of third fibers to the third inlet header; and
    combining a stream of the third aqueous slurry with the streams of the first and second aqueous slurries in the region of the multilayer headbox slice outlet to define the jet exiting the multilayer headbox slice outlet.

10. The process of claim 9, wherein the third fibers have an average length that is less than the average length of the first fibers.

11. The process of claim 9, wherein the third fibers have an average length that is equal to or greater than the average length of the first fibers.

12. A multilayer paper product, wherein the multilayer paper product is made by a process comprising:
    providing a forming fabric carried by a breast roll and at least one additional roll;
    causing the forming fabric to rotate such that an upper surface of the forming fabric moves in a machine direction;
    providing a multilayer headbox comprising first and second inlet headers and a multilayer headbox slice outlet, the first inlet header being located below the second inlet header;
    providing a first aqueous slurry of first fibers to the first inlet header and a second aqueous slurry of second fibers to the second inlet header, the first fibers having an average length greater than an average length of the second fibers;
    combining streams of the first and second aqueous slurries in a region of the multilayer headbox slice outlet to define a jet exiting the multilayer headbox slice outlet;
    emitting the jet of combined, yet still stratified, slurries onto the upper surface of the forming fabric, wherein the jet of combined slurries forms a web on the forming fabric, wherein a greater percentage of the first fibers are nearer the forming fabric than the second fibers;
    causing the forming fabric to oscillate in a direction transverse to the machine direction, whereby a majority of the first fibers are caused to be biased in a cross-machine direction without causing a majority of the second fibers to become aligned away from a machine direction; and
    forming the multilayer paper product from the web.

13. A multilayer paper product comprising first fibers and second fibers, wherein:
    the first fibers comprise an average length greater than an average length of the second fibers;
    a majority of fibers located nearer one outer surface comprise the first fibers and a majority of the fibers located toward an opposing outer surface comprise the second fibers;
    a majority of the first fibers are biased a direction extending from between >0 and ~90 degrees relative to the machine direction; and
    a majority of the second fibers are aligned in a machine direction.

14. The multilayer paper product of claim 13, wherein the majority of the first fibers are biased toward a cross-machine direction.

15. The multilayer paper product of claim 13, further comprising third fibers that are located nearer the opposing outer surface than the second fibers.

16. The multilayer paper product of claim 15, wherein the third fibers have an average length that is less than the average length of the first and second fibers.

17. The multilayer paper product of claim 15, wherein the third fibers have an average length that is equal to or greater than the average length of the first fibers.

\* \* \* \* \*